Patented May 13, 1930

1,758,913

UNITED STATES PATENT OFFICE

SAMUEL S. SADTLER, OF SPRINGFIELD TOWNSHIP, MONTGOMERY COUNTY, PENNSYL-
VANIA, ASSIGNOR TO AMIESITE ASPHALT COMPANY OF AMERICA, OF CAMDEN,
NEW JERSEY, A CORPORATION OF NEW JERSEY

ROAD-BUILDING MATERIAL AND METHOD OF MAKING THE SAME

No Drawing.    Application filed May 28, 1929.    Serial No. 366,770.

The present invention relates to that type or kind of roadway wherein the stone, sand, cinders, slag or other suitable material, constituting the aggregate, graded as to size, is thoroughly coated with a bituminous material or asphaltic cement of relatively high penetration in such a manner that the aggregate, in a cold state, may be coated with the bitumen, and stored at the plant where it is made, or placed in cars and transported over long distances and laid at atmospheric temperatures and then compacted into a finished roadway. In such a road the base or lower course is usually composed of relatively large graded stones or aggregate. After placement, this course is preferably rolled by a heavy roller, and then a second course, composed of smaller stones that have been coated and treated in like manner, is laid thereon and similarly rolled. While this second or wearing course will present a generally even surface, the texture thereof will be rough. This texture can be controlled by the sizing of the stone to produce an appearance somewhat like grained leather, and as this course is exposed to traffic, the kind of texture to be imparted thereto will be determined by the conditions to which the road is to be subjected, in order to provide the roadway with a suitable non-skid surface.

Roadways having a foundation and wearing course of the character above described are disclosed in United States Letters Patent No. 1,611,444, granted December 31, 1926, to D. M. Hepburn and No. 1,674,523, granted June 9, 1928, to the present applicant.

The present application is an improvement on the processes of the above-mentioned patents, for the process disclosed herein produces a great improvement in the physical condition of the asphalt by increasing the ductility, coherence and plasticity of the asphaltic material and in causing the bituminous material to be more resistant to the action of water, more ductile and more tenacious. Asphalt treated in accordance with my present invention and containing a relatively small amount of rubber is still asphalt, but its physical properties will be changed in the manner above indicated, and its property of adhering to mineral aggregate and of firmly uniting contiguous pieces of coated aggregate so that they cohere together more firmly is also substantially increased.

One of the objects of the invention defined in the said Hepburn Patent No. 1,611,444, was to provide the aggregate with a thicker coat of bituminous material, more permanently attached to the aggregate so that when the courses of aggregate are laid in the roadway and compressed, the cohesion between the contiguous pieces of coated aggregate and between the coating and the aggregate itself is substantially increased on account of the said heavy coating of asphalt.

In the process which I am about to disclose, the addition of a relatively small amount of rubber, as will be presently described, produces a very beneficial change in the physical characteristics of the asphalt, so that it will produce a heavier coating, more firmly anchored to the aggregate and with the individual pieces of coated aggregate more permanently attached together. The addition of rubber in small quantities produces all of the qualities above-mentioned and which are so beneficial and desirable in a pavement of this type. I have discovered if, in the preparation and treatment of the aggregate for making roads of the character described in the above-mentioned Letters Patent at some stage of the preparation of the said material, I incorporate into an asphaltic or bituminous binder or cement, a very small percentage, by weight, to the asphalt, of rubber that the character and properties of the asphalt used in the making of such roadways is greatly improved, and it is one of the objects of the present invention to produce roads of the character which have been above discussed and described, but in which the process has been changed by the addition to the bitumen or asphalt binder, of a small quantity of rubber which causes the binding material to adhere even more closely and permanently to the individual pieces of aggregate, the pieces of aggregate after compression in the roadway to cohere to each other more permanently and tightly, and to impart more resiliency to the finished roadway than was possible by the practice of the methods disclosed in the aforesaid patents.

A further object of my invention is to produce an aggregate which is provided with an asphaltic or bituminous coating in which there is great cohesion between the coated stones after the courses have been laid and compressed, but in which there is no substantial increase in the tackiness of the pieces of aggregate for each other prior to compression and which, therefore, will permit of storage or transportation of the thoroughly and thickly coated aggregate without solidification of the mass at normal air temperatures.

A further object of my invention is to incorporate, in an asphaltic or bituminous cement of high penetration, a small quantity of rubber and to thereby increase the ductility, coherence and plasticity of the asphaltic binder, thereby changing the physical properties of the bituminous material and making it more resistant to the action of water, more ductile and more tenacious. The asphalt treated in accordance with my present invention is improved by having its property of adhering to mineral aggregate and of more firmly uniting contiguous pieces of compressed aggregate and of causing them to cohere more firmly in a compressed state.

Other objects of my invention will appear in the specification and claims below.

In applying the present invention to an aggregate which has been dried as disclosed in the said Letters Patent to Hepburn, the aggregate is preferably delivered to a pug mill mixer which is in motion. The aggregate should not contain any "fines" and by "fines" I mean pieces of aggregate smaller than one-eighth of an inch in diameter, or which will not pass through a screen provided with one-eighth of an inch openings. This fine-free aggregate is used in carrying out this process in making all the courses except the sealing course of the roadway, as will be referred to again below. I then add to the aggregate being agitated in the pug mill, a liquefier which may be a solvent of asphalt or other bituminous material used as the cement or binder. This liquefier may be gasoline, kerosene, naphtha or light coal tar solvents, or any solvent which I may desire to use. It is preferably slowly volatile, particularly when the aggregate has been dried as in the said Hepburn patent.

I prefer to use as much of the liquefier as will saturate the dried stone aggregate and dampen the surfaces thereof with the said liquefier.

I now add to the mixture being stirred and agitated in the mill, the rubber or similar material, such as balata or gutta percha, but I preferably use rubber in aqueous dispersion, such as rubber latex containing from 30% to 60% of rubber. I have found that a latex containing 40% of rubber is well adapted to the purpose.

The amount of latex to be used is computed on the basis of the actual rubber content of the latex. Thus with a 40% latex, I may use two and one-half times as much latex by weight as I would of solid rubber, it being remembered that the amount of rubber to be added is computed upon the amount of asphalt in the mixture, the amount of rubber in the finished mixture being preferably only susbtantially one-half of one per cent of the weight of the asphalt.

After the latex has thus been added and thoroughly distributed throughout the aggregate in the pug mill, I then add the required quantity of asphalt or other bituminous material. I can use substantially any asphalt of from 70 to 130 penetration, as I may find the conditions to warrant, or I may use any other bituminous material suitable for the purpose. I preferably heat the said bituminous material to a temperature of substantially 250° F. or more.

After the asphalt has been thoroughly distributed throughout the aggregate in the pug mill mixer, I may then add from two tenths of one per cent to one per cent of lime based on the weight of the aggregate in the mixer, which lime may be either caustic or hydrated, the purpose of the lime being to toughen the asphalt and help to thicken the bituminous material on the pieces of aggregate.

The quantity of the asphalt or similar material which I use will vary, dependent upon the size of the individual pieces of aggregate to be coated therewith. For the base course, wherein are the larger stones, I make use of bitumen varying from three per cent. to six per cent. of the weight of the stone or aggregate. For the wearing course, I may use from five per cent. to eight per cent. of the weight of the stones; but for the sealing course I preferably use only from one per cent. to three per cent. of the weight of the sand or "fines". The stirring and mixing and agitating of the materials in the pug mill is continued until all of the pieces of aggregate have been thoroughly coated with the bitumen and until the bitumen is uniformly mixed and distributed throughout the mass of aggregate.

At this time, while the mixture is still being agitated and after the pieces of aggregate have thus been thoroughly coated with bitumen, I add from four to eight per cent of the "fines" the proportion being based upon the weight of the finished mixture. These "fines" may be the stone "fines" or sand passing through a screen of substantially one-eighth inch mesh, or cinders or slag or any other suitable material which will pass through a screen of that mesh. These "fines" are added while the mixer is still in motion and the said "fines" will stick to the individual pieces of aggregate already coated with a heavy film of bitumen. The addition of these "fines" results in the formation on the individual pieces of aggregate of a plastic asphalt cement (sand, asphalt and a liquefier) covering the faces of the individual pieces of aggregate, thereby also making the coating of asphaltic material thicker and more permanently attached to the individual pieces. When the "fines" are added at this stage in the process, the material constituting the "fines" will be uniformly distributed throughout the mass, sticking to the surfaces of the coated aggregate, whereas, were the "fines" to be added before the asphalt is put into the mixing mill, a large proportion of the asphalt would be taken up and used in coating the "fines" which would not be uniformly mixed throughout the mass, with the result that the paving material would be lumpy and hard to handle and full of balls of asphalt covered sand and when the pavement is laid and compressed, the "voids" would not be uniformly distributed throughout the course of paving made therefrom.

In order to produce a pavement that is thoroughly resilient and in which there are literally millions of "voids" forming expansion joints uniformly distributed throughout the course, the "fines" must be added after the asphalt has coated the larger individual pieces of aggregate.

In carrying out my process, I desire the temperature of the stone at as near that of the atmosphere as possible, in order that the hot asphalt, on coming into contact with the cool stones, will chill and remain anchored to the surface of the individual pieces of aggregate until such time as the "fines" are added to the mixture. The addition of the "fines" to the mixture in the manner above described thickens the coatings of cement on the surface of the individual pieces of aggregate and causes the asphalt to stay on the stone without running away or settling to the bottom of the mass of aggregate. After having been prepared, the material is ready to be transported by trucks, railroad cars, or to be stored in bins until ready for use, and thereafter it can be laid into a paving course without further treatment and at atmospheric temperatures.

A pavement may be laid of aggregate prepared as above described, in any desired number of courses. I preferably use it for two courses, namely, an under course or foundation course containing the larger pieces of aggregate, and a second course in which the aggregate is of smaller size and which is interlocked into the foundation under pressure. Such a two-course roadway may be provided with a top or third or sealing course, made of "fines" or sand used as an aggregate. When a third course is to be used as a sealing course, it is not necessary to use more than four pounds thereof to the square yard.

To make such a sealing course, the aggregate of "fines" is mixed in the pug mill mixer in the same manner as I have above described, except that no further "fines" will be added after the particles of aggregate have been coated with the asphaltic material and the percentage of asphaltic material to the aggregate, by weight, may be as low as from one per cent. to three per cent. of the weight of the aggregate. A paving material so prepared for a third or sealing course is preferably sprinkled or raked over the top surface of the wearing course with the back of a board so that the stones of the wearing course are not covered, but the coated "fines" are spread into the voids of the pavement and they are then preferably compressed into the wearing course by the weight of traffic thereon. I prefer not to roll the top course but to accomplish the rolling by the soft tires of the vehicular traffic which will fit in between the stones and compress the sealing course, thereby leaving the unevenness of the individual stones in the surface course exposed to form a non-skid surface.

Since the asphaltic material thus treated for the third or sealing course has greater plasticity and greater adhesiveness or coherence under compression than the materials heretofore used for forming the sealing course, a much better sealing of the surface of the wearing course is accomplished. The voids in the wearing course adjacent the surface and the spaces between the stones at the surface are filled with said sealing material which eventually prevents the passage of water therethrough to the voids or pockets between the aggregate pieces of the course beneath it.

By the practice of this invention, I am able to use the same grades of asphalt or similar material for the three courses of a finished roadway, and I am able to change the physical condition and properties of the asphalt employed during the making of the material for the different courses of the road.

By the practice of this invention I may use an asphalt of higher penetration and lower ductility than that usually employed in making roads of the above described character, for by the addition thereto of the said small quantity of rubber I make the asphalt sufficiently adhesive, plastic and penetrating to be used as the coating and binding material of the aggregate of the course of a roadway.

I may vary the process above described in several ways without departing from the spirit and scope of the invention. Thus I may use pure rubber or solid rubber or crepe rubber dissolved in a suitable solvent, such as a hydrocarbon oil instead of using latex. As a matter of fact, crepe rubber is relatively easily soluble in hot asphalt and if so desired, I may dissolve the rubber or the rubber latex directly in the hot asphalt, in which event the asphalt containing the small amount of rubber which characterizes my invention may be kept in the circulating system of the plant and a supply of asphalt containing the small percentage of rubber may be drawn off from time to time for use in the pug mill for coating the aggregate.

Furthermore, in the practice of this invention and in accordance with the process above described, I may first dissolve the rubber in a suitable solvent, such as hydrocarbon oil, instead of using latex in the liquefier or admixed with the aggregate.

When a damp gabbro or basalt is used as an aggregate, as is disclosed in my Letters Patent No. 1,674,523, the mode of procedure and the proportions of the ingredients as above given and as given in the said Letters Patent, may be closely followed, except that I prefer to add the latex to the aggregate in the pug mill before the liquefier is added to said aggregate. The damp aggregate at atmospheric temperatures is preferably agitated in the pug mill in the presence of the rubber latex before the liquefier is added. The latex, being an aqueous dispersion of rubber, is thus readily distributed over the damp surfaces of the aggregate. Then the liquefier may be added to replace whatever water there may be on the stone surfaces and then the melted asphalt, heated to substantially 250° F. is added, all with agitation. As in the description above given, after the pieces of aggregate have been thoroughly coated with the bitumen, the "fines" are added to form an asphaltic mortar on the pieces of aggregate and to thicken the coating thereon.

In applying this invention to soft, water-absorptive limestone as an aggregate, I prefer to emulsify and disperse the liquefier in some form of soap containing unneutralized acids and the use of this aggregate is fully disclosed in my said Letters Patent No. 1,674,523. I preferably use substantially one pound of sulphonated oil or substantially one per cent of the weight of 100 pounds of asphalt used in treating the 1900 pounds of stone aggregate referred to in said Letters Patent.

In carrying out this modification of my process, I first add the latex to the cold stone aggregate in the mixer in the examples above given, and I then add the sulphonated oil to said aggregate and then the liquefier, following the procedure above described. In this way the liquefier is dispersed in water and thoroughly mixed with the aqueous dispersion of rubber and thoroughly distributed throughout the aggregate. Then upon adding asphalt slowly and while the mixer is being constantly stirred, an aqueous dispersion of the asphalt itself is readily effected in the presence of the churning aggregate and water. After the aggregate has been thoroughly coated with this asphaltic emulsion or dispersion, a small quantity of lime, sufficient to toughen the asphalt, and the "fines" may be added, as above described, to produce the finished material, for either the foundation or the wearing course of the roadway.

The amount of 40% rubber latex which I thus use in the practice of these processes is from one-half of one per cent to five per cent of the weight of the asphalt used; giving in the finished mixture preferably one-half of one per cent of the rubber or one-half pound of rubber to one hundred pounds of the asphalt.

I may, however, vary this modification of my process and produce the desired results. Thus I may emulsify the liquefier, then disperse the latex in the liquefier and then add the emulsified or dispersed liquefier and latex to the aggregate in the mill and proceed as above described.

In all the various modifications of this invention it will now be plain that a very small percentage of rubber to the weight of asphalt is employed and that the effect of this small quantity of rubber is not the production of a rubber product, but of a new and different asphaltic material having the desirable properties above described.

I find that the asphalt or bitumen protects the rubber but any well known inhibiting agent may be added if desired in small quantities to further protect the rubber. Such agents may be the concentration products of certain aldehydes and organic bases, such as aldol and naphthylamine.

Having thus described my invention, what I claim and desire to protect by Letters Patent of the United States is:

1. The method of making a bituminous paving material, which consists in adding to a graded mineral aggregate a bituminous binding material and agitating said aggregate in said material with the presence of a liquefier for said bituminous binding material and a relatively small quantity of rubber, until the pieces of aggregate are provided with a relatively thick coating of bituminous cement, the weight of said rubber being from two tenths of one per cent to two per cent of the weight of said bituminous cement.

2. The method of making a bituminous paving material, which consists in adding to a graded mineral aggregate, without "fines", a bituminous binding material and agitating said aggregate with said binding material in the presence of a liquefier for said bituminous material, and a relatively small quantity of rubber until the pieces of aggregate are provided with a relatively thick coating of bituminous cement, the weight of said rubber being from two tenths of one per cent to two per cent of said bituminous cement, and then adding thereto finely divided inert mineral material of the consistency of "fines", and thoroughly distributing the same throughout the coated aggregate by agitation.

3. The method of making a bituminous paving material, which consists in adding to a mineral aggregate, a bituminous binding material and agitating said aggregate with said binding material in the presence of a liquefier of said material, lime and rubber until the surfaces of the pieces of said aggregate are thoroughly coated with a relatively thick coat of asphaltic cement, the weight of said rubber being from two tenths of one per cent to two per cent of the weight of said bituminous cement.

4. The method of making a bituminous paving material, which consists in adding to a relatively cold graded mineral aggregate, a bituminous binding material and agitating said aggregate with said material in the presence of a liquefier of said binding material and rubber, until the surfaces of the pieces of said aggregate are thoroughly coated with a relatively thick coating of bituminous cement, the weight of said rubber being from two tenths of one per cent to two per cent of the weight of said bituminous cement, and then adding to the mixture a quantity of lime and "fines", insufficient to fill the voids between the pieces of aggregate, and agitating said mixture until said "fines" are thoroughly distributed throughout said mixture to substantially increase the thickness of the coating on the individual pieces of said aggregate.

5. The method of making a bituminous paving material, which consists in adding to a relatively cold graded mineral aggregate, a heated bituminous material and agitating said aggregate with said material in the presence of a liquefier of said material, a small quantity of lime and of rubber, said cold aggregate being operative to chill said bituminous material upon contact therewith and to cause the bituminous material to adhere tightly to said pieces of aggregate and continuing said agitation until the surfaces of the pieces of said aggregate are thoroughly coated with a relatively thick coating of said material, the weight of the rubber being from two tenths of one per cent to two per cent of the weight of said bituminous material.

6. The method of making a bituminous paving material, which consists in continuously agitating a relatively cold graded mineral aggregate and adding thereto a liquefier of bituminous binding material in quantities sufficient to wet therewith the surfaces of the pieces of aggregate, then adding thereto, while the mixture is still being agitated, a small quantity of rubber, then adding to the mixture a quantity of bituminous binding material, heated to a temperature of substantially 250° F., and a small quantity of lime, while the agitation of said aggregate is continued until the pieces of aggregate are thoroughly coated with bituminous cement, the quantity of rubber by weight being from two tenths of one per cent to two per cent of the weight of said bituminous cement.

7. The method of making a bituminous paving material, which consists in continuously agitating a relatively cold graded mineral aggregate, without sands or "fines", and adding thereto a bituminous binding material and agitating said aggregate in said binding material in the presence of a solvent of said bituminous material, a small quantity of lime and a small quantity of rubber latex until the surface of the pieces of said aggregate are thoroughly coated with a relatively thick coating of said bituminous cement, the weight of said rubber in said latex being from two tenths of one per cent to two per cent of the weight of said bituminous cement, and then adding, while the mixture is still being agitated, from four to eight per cent of the weight of said mixture of sand and "fines" to distribute said sand and "fines" thoroughly throughout said mixture and to provide the surfaces of the pieces of aggregate in said mixture with a relatively thick coating of asphaltic cement.

8. The method of making a bituminous paving material which consists in thoroughly agitating a relatively cold graded mineral aggregate and then adding thereto a slowly volatile liquefier of bituminous binding material, and a relatively small amount of rubber latex and lime, the weight of the rubber in said latex being from two tenths of one per cent to two per cent of the weight of bituminous binding material to be added thereto, and then adding said bituminous binding material heated to a temperature of substantially 250° F. and continuing said agitation until the pieces of aggregate are provided with a relatively thick coating of bituminous cement.

9. The method of making a bituminous paving material, which consists in constantly agitating a graded mineral aggregate, without sands or "fines", and adding thereto a volatile solvent of bituminous material and rubber latex, and then adding thereto, while said agitation is continued, a bituminous binding material of high penetration, heated to a temperature of substantially 250° F., and continuing said agitation until the pieces of aggregate are provided with a thick coating of said bituminous material, in which the physical characteristics of the bituminous materail are changed and the ductility thereof is increased, the weight of the rubber in said latex being from two tenths of one per cent to two per cent of the weight of said bituminous material, and then forming on the coated surface of said aggregate, a thick tough coating of bituminous mortar by adding to said mixture, while agitation is being continued, lime and finely divided inert mineral material.

10. The method of making a bituminous paving material, which consists in agitating a mass of relatively cold graded mineral aggregate and adding thereto a bitminous material of high penetration in fluent condition, in the presence of an emulsion of a solvent of said bituminous material, and rubber latex, the weight of the rubber in said latex being from two tenths of one per cent to substantially two per cent of the weight of said bituminous material, said agitation being continued in the presence of a small quantity of lime until the pieces of aggregate are provided with a relatively thick tough coating of bituminous cement.

11. The method of making a bituminous paving material, which consists in agitating a mass of relatively cold graded mineral aggregate and adding thereto a bituminous material in fluent condition, in the presence of an emulsion of a solvent of said bituminous material, and rubber latex, the weight of the rubber in said latex being from two tenths of one per cent to substantially two per cent of the weight of said bituminous material, said agitation being continued until the pieces of aggregate are provided with a relatively thick coating of said bituminous material.

12. The method of making a bituminous paving material, which consists in adding to a relatively cold graded mineral aggregate, without sands or "fines", a bituminous material of high penetration and low ductility in fluent condition, and agitating said aggregate with said material in the presence of an aqueous dispersion of a solvent of said bituminous material, and rubber latex until the surfaces of the pieces of said aggregate are provided with a relatively thick coating of said bituminous material, the weight of the rubber being from two tenths of one per cent to two per cent of said bituminous material, and then adding to the mixture, while the agitation is being continued, lime and finely divided inert mineral matter.

13. The method of making a bituminous paving material, which consists in adding to a relatively cold graded mineral aggregate, without sands or "fines", a bituminous material of high penetration and low ductility in fluent condition, and agitating said aggregate in said material in the presence of an aqueous dispersion of a solvent of said bituminous material, and rubber latex, until the surfaces of the pieces of said aggregate are provided with a relatively thick coating of said bituminous material, the weight of the rubber being from two tenths of one per cent to two per cent of said bituminous material, and then adding to the mixture, while the agitation is being continued, lime and finely divided inert mineral matter, the weight of said finely divided mineral matter being from four per cent to eight per cent of the weight of said mixture.

14. The method of making a roadway which consists in making a foundation course by adding to a relatively cold graded mineral aggregate a bituminous binding material of high penetration in a fluent condition and agitating said aggregate with said material in the presence of a liquid solvent of said material, a small quantity of rubber latex and of lime until the surfaces of the pieces of said aggregate are provided with a relatively thick coating of said binding material, the weight of said rubber in said latex being from two tenths of one per cent to two per cent of the weight of said bituminous material, and the weight of said bituminous material being from three to six per cent of the weight of the aggregate, and adding "fines", the weight thereof being from four to eight per cent of the weight of said mixture, the agitation being continued until a bituminous cement containing "fines" is formed on said coated pieces of aggregate then laying a foundation course of said material on the roadbed and compressing the same, then placing on the foundation course so formed an upper course composed of the same materials similarly mixed with the same ingredients except that the mineral aggregate is smaller in size and that the weight of the bitumen thereon is from five to eight per cent of the weight of the aggregate, and then compressing said course.

15. The method of making a roadway which consists in making a foundation course by adding to a relatively cold graded material aggregate, a bituminous material of high penetration in a fluent condition and agitating said aggregate in said material in the presence of a liquid solvent of said material, a small quantity of rubber and of lime until the surfaces of the pieces of said aggregate are provided with a relatively thick coating of said material, the weight of said rubber in said latex being from two tenths of one per cent to two per cent of the weight of said bituminous material, and the weight of the bituminous material being from three to six per cent of the weight of the aggregate, and then adding "fines", the weight thereof being from four to eight per cent of the weight of said mixture, while said agitation is being continued and until a bituminous cement containing "fines" is formed on said coated pieces of aggregate, then laying a foundation course of said material on the roadbed and compressing the same, then placing on the foundation course so formed an upper course composed of the same materials similarly mixed with the same ingredients except that the mineral aggregate is smaller in size and that the weight of the bitumen thereon is from five to eight per cent of the weight of the aggregate, then compressing said course and then making a sealing course by agitating relatively cold aggregate, composed of finely divided inert mineral matter, in like bituminous material in the presence of a similar proportion of fluent solvent, rubber latex and lime, the proportion of bituminous material to the fine aggregate being from one to three per cent of the weight of the said aggregate, and sprinkling the material so formed over the surface of the said upper course into the depressions surrounding the pieces of aggregate which form the texture of the surface of said second course, and to fill the voids in said course at and near the surface of said course.

16. The method of providing a roadway having a wearing course composed of graded stone aggregate having voids throughout said course between the individual stones, with a sealing course which does not efface the stony texture of the upper surface of said wearing course, which consists in agitating together an aggregate composed of finely divided mineral matter, a slightly volatile liquid solvent for bitumen, and rubber, which may also be soluble in said solvent, and then thoroughly mixing therewith a bitumen of high penetration and in a melted condition, and in sufficient quantity to provide said particles of said aggregate with a complete relatively thick coat of said bitumen, the quantity of rubber being by weight substantially one-half of one per cent of the bitumen, and then spreading said material over the upper surface of said wearing course and smoothing the same to the level of the tops of the stones at the surface of the wearing course to fill the voids in the wearing course near the upper surface of the wearing course.

In witness whereof, I have hereunto set my hand this 27th day of May, 1929.

SAMUEL S. SADTLER.